United States Patent [19]

Olson

[11] Patent Number: 4,802,399

[45] Date of Patent: Feb. 7, 1989

[54] PANEL SAW APPARATUS

[76] Inventor: Eugene T. Olson, 1250 135th Ave. N.E., Anoka, Minn. 55303

[21] Appl. No.: 78,412

[22] Filed: Jul. 27, 1987

[51] Int. Cl.⁴ .............................................. B27B 5/06
[52] U.S. Cl. ..................................... 83/425; 83/471.3; 83/485; 384/55; 384/58
[58] Field of Search ..................... 83/471.2, 471.3, 473, 83/485–489, 432, 437, 614, 425; 384/50, 55, 58, 59, 19

[56] References Cited

U.S. PATENT DOCUMENTS

| | | | |
|---|---|---|---|
| 3,008,498 | 11/1961 | Olson | 83/486 |
| 3,151,642 | 10/1964 | Olson | 83/486.1 |
| 3,315,554 | 4/1967 | Jaegers | 83/488 |
| 3,552,805 | 1/1971 | Dunlap | 384/55 |
| 3,757,838 | 9/1973 | Lee | 83/471.3 |
| 3,866,496 | 2/1975 | Payne et al. | 83/486 |

FOREIGN PATENT DOCUMENTS

| | | | |
|---|---|---|---|
| 464431 | 8/1928 | Fed. Rep. of Germany | 384/55 |
| 782689 | 9/1957 | United Kingdom | 384/50 |

Primary Examiner—Frank T. Yost
Assistant Examiner—Hien H. Phan
Attorney, Agent, or Firm—Peterson, Wicks, Nemer & Kamrath

[57] ABSTRACT

The panel saw apparatus includes a pair of laterally spaced H-beams are attached. A first pair of leg portions of one H-beam have slots adjacent its ends so that this H-beam can, by means of bolts passing through the slots, be adjusted into a parallel relationship with the other H-beam. The second pair of leg portions of each H-beam each have a groove formed therein so that a strip portion of a rail member can be press-fitted therein. The rail members have shoulders that bear against the second leg portions of the H-beam with which they are associated. A carriage has wheels complementally grooved with respect to angled surfaces on the rail members thereby constraining the carriage for reciprocal movement. The carriage includes a turntable mounted for rotation with respect to a plate and its circular opening. An electric motor is mounted on one side of the turntable and a saw mount on the other side; a flexible belt extends through a segmental opening in the plate. A pressure foot mechanism assists in holding a panel board in place. A brake mechanism is engageable with one of the leg portions belonging to one of the H-beams.

17 Claims, 6 Drawing Sheets

PANEL SAW APPARATUS

BACKGROUND OF THE INVENTION

1. Field of the Invention

This invention relates generally to panel saw apparatus, and pertains more particularly to apparatus of this type in which the turntable resides in an offset plane sufficiently forward of the panel board being cut so as to enable a circular saw blade to be mounted for rotation at the rear side of the turntable yet driven by a motor mounted on the forward side of the turntable.

2. Description of the Prior Art

Apparatus for sawing panel boards is certainly not new. While prior art machines have operated in a generally satisfactory manner, nonetheless there have been problems with respect to obtaining and retaining an accurate alignment of the circular saw with respect to the panel board being cut. Where the alignment must be obtained in the field, the problem becomes even more severe, for a trained technician is usually required. Operators of such apparatus cannot be depended upon to make sure that the alignment, even though accurately obtained, is maintained. Even if care is exercised with respect to maintaining an accurate alignment, prior art apparatus has not permitted the operator to obtain a good view of the circular saw with respect to the panel board being cut. Obviously, if the operator's vision is interfered with when starting a cut, whether in a horizontal or vertical direction, any discrepancy or inaccuracy is retained during the entire cut, even though the equipment is accurately aligned. Hence, both alignment and visibility have been two closely related problems that have constituted a shortcoming as far as prior art apparatus is concerned.

SUMMARY OF THE INVENTION

Accordingly, an important object of the present invention is to achieve an accurate alignment that will be retained throughout the life of the apparatus. In this regard, the invention has for an aim the achieving of an accurate alignment at the factory before the apparatus is shipped, thereby obviating any need to make any alignment or adjustment in the field where the apparatus is to be used. Alignment in the field requires an adjustment by a trained technician and can be quite costly. It is within the purview of the present invention to completely eliminate any such field alignment, the factory alignment being sufficiently reliable so that once the apparatus leaves the factory no further adjustment is required unless the apparatus i subjected to severe mishandling during shipping or abuse at the user's place of business. When practicing the present invention, cuts can be accurately made within ±0.005 inch.

Another object is to provide an excellent field of view for the operator with respect to the work. In this regard, an aim of the invention is to offset in a forward direction the turntable, the offsetting being sufficient so that a motor can be mounted on the forward side of the turntable and the circular saw mounted on the rear side of the table without having only a segmental portion of the saw on one side and another segmental portion on the other side. More specifically, it is within the purview of the invention to provide enough space between the panel board being cut and the turntable so that the entire saw blade can be disposed on the rear side of the turntable, thereby permitting the operator to see the cutting edge of the saw as it initially engages the work and also to allow continued viewing of the blade as the cut progresses.

Another object of the invention is to provide a tracking arrangement for the carriage and also the turntable so that the likelihood of a sawdust build-up is minimized. However, the arrangement of the component parts constituting my panel saw apparatus is such that it is completely compatible for the inclusion of a dust control system that will more fully assure that there will be no objectionable build-up of sawdust on any of the parts, and of course which will enable the operator to more completely view the panel board being cut.

In addition to providing an improved degree of visibility as far as the work is concerned, the open spacing of the component parts allows easy access to all of the moving parts so that they can be cleaned and if circumstances so dictate they can be replaced. However, apparatus in accordance with the present invention is exceptionally rugged and replacement of any parts is highly unlikely to be required.

Owing to the enhanced visibility my invention provides, there is sufficient space provided so that a floating, adjustable saw foot can be employed which rides generally on the surface of the material being cut. In this way, any objectionable vibration is avoided and chip-free cutting is assured.

Yet another object of the invention is to provide a turntable in which the motor is mounted on one side thereof and the circular saw blade on the other side thereof can be readily indexed between the 90° positions needed for horizontal and vertical cutting.

Still further, an object of the invention is to provide a means for keeping thin, flexible panels flat while being moved through the machine, the space enhancing the visibility of the work also providing sufficient space in which a hold down bar can be employed for maintaining the flat or planar condition of thin and flexible panels while being cut.

DESCRIPTION OF THE PREFERRED EMBODIMENT

Figure 1:
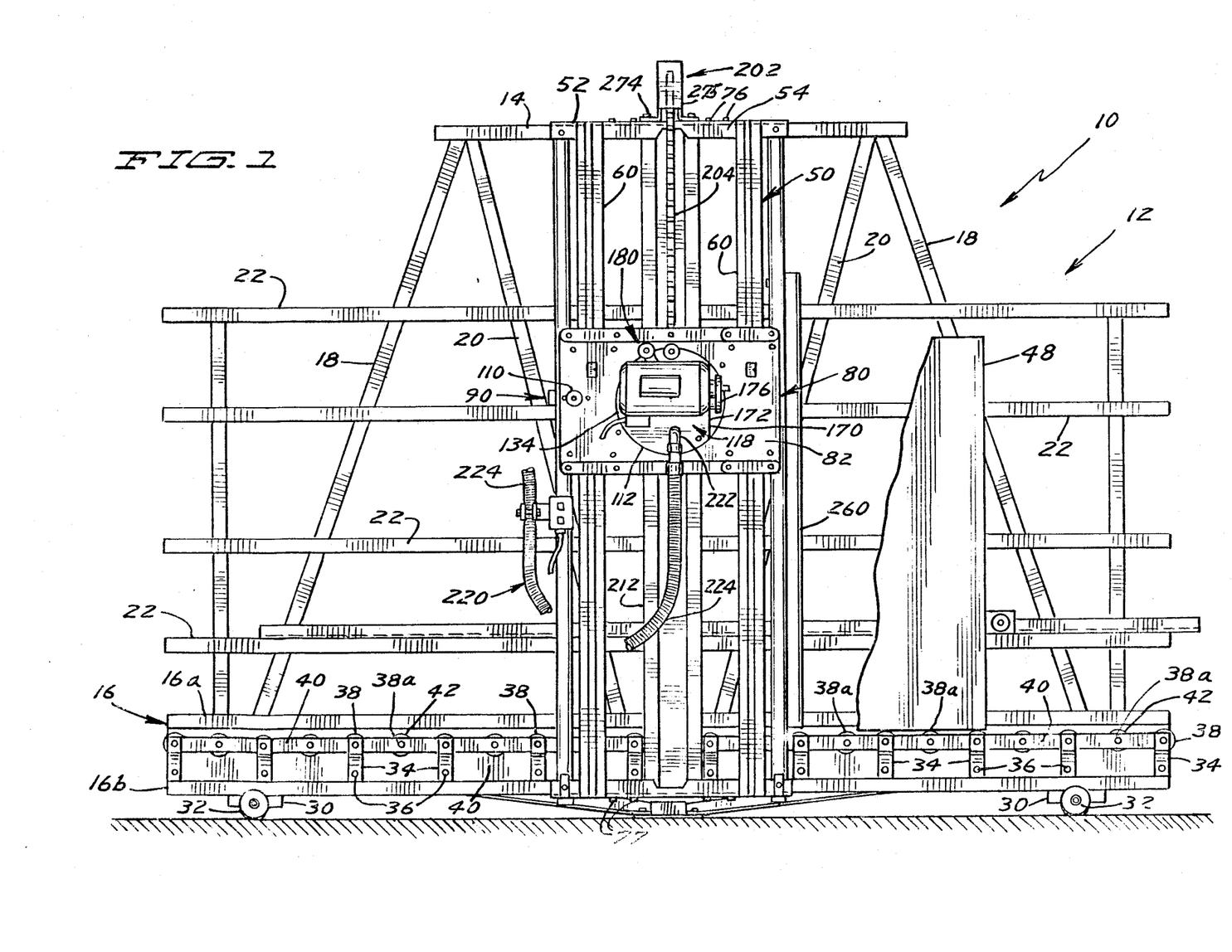
FIG. 1 is a front elevational view of saw panel apparatus exemplifying my invention.
Figure 2:
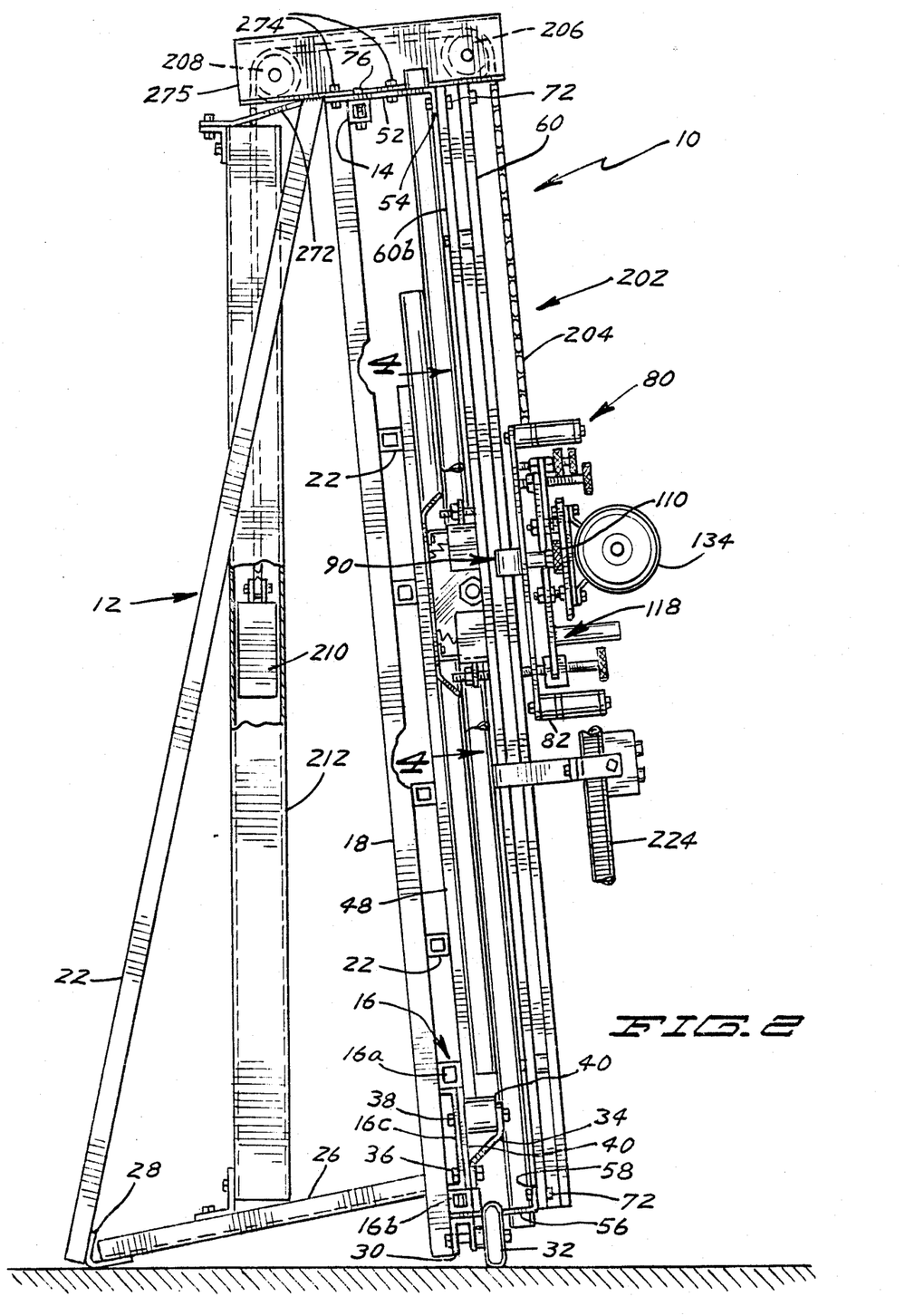
FIG. 2 is a side elevational view, the view being taken from the left in FIG. 1.

Referring now to FIGS. 1 and 2, panel saw apparatus illustrating my invention has been denoted generally by the reference numeral 10. The apparatus 10 includes an A-frame 12 having a top bar 14, a bottom channel unit 16 comprised of upper and lower bars 16a, 16b and a web 16c, generally vertical bars 18 and 20 forming two inverted V-shaped configurations, and a plurality of horizontal bars 22. Although only one such member 26 can be seen in FIG. 2, there are two lower members 26 that converge toward each other, being attached to an angle member 28 that is also attached to the lower ends of the inclining vertical bars 20.

Beneath the channel unit 16 are a pair of inverted channel members 30 (see FIG. 2). Each member 30 has a wheel 32 journaled thereon. The wheels 32, together with the angle member 28, provide an easel-like support for the A-frame 12, yet rendering the apparatus 10 sufficiently portable that it can be moved from place to place.

A series of brackets 34 having a distorted Z-shaped configuration (see FIG. 2 for the Z configuration) have bolts 36 at their lower ends that extend through the web of the channel unit 16. Each bracket 34 has a bolt 38 extending through its upper end and also through the web 16c of the channel unit 16. The upper bolts 38 also extend through a horizontal strip 40. Whereas the bolts 38 journal a number of laterally spaced rollers 42 for rotation about horizontal axes, additional bolts 38a that extend through just the strip 40 and the channel unit 16 similarly journal additional rollers 42. In this way, the various rollers 42 support the lower edge of a panel board 48 that is to be cut in a manner yet to be described.

Although of practical importance, the apparatus 10 described up to this point does not play a vital role in the practicing of my invention. However, the description that has been given should help in appreciating the benefits to be derived from a practicing of the invention now to be referred to.

Therefore, attention at this time is directed to a track unit 50 which includes a top plate 52 having a downturned flange 54 (see FIG. 2). The track unit 50 additionally includes a bottom sole plate 56 having an upturned flange 58 (see FIG. 2).

Figure 6:
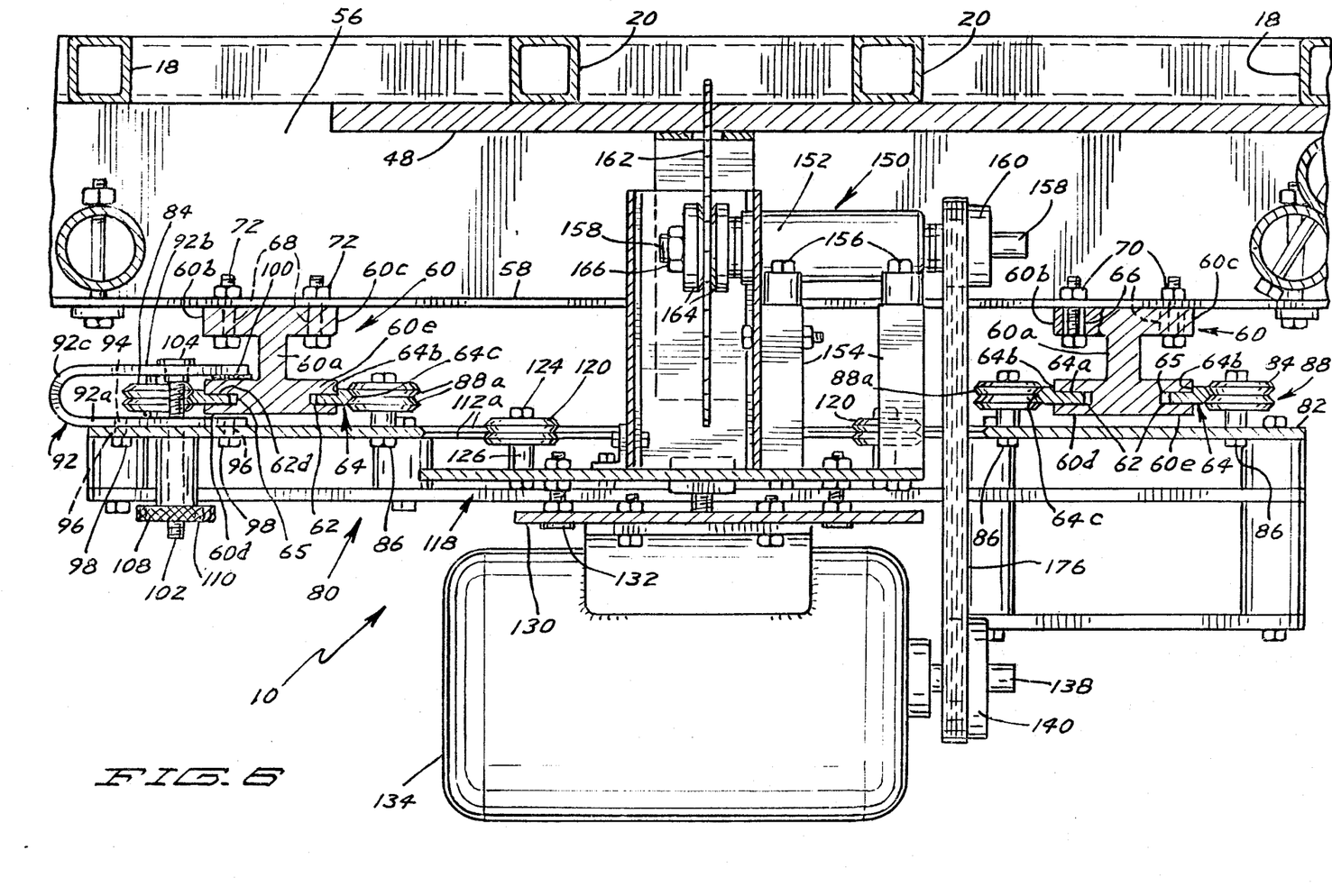
FIG. 6 is a horizontal sectional view taken in the direction of line 6—6 of FIG. 3, the view being on a larger scale than that of FIG. 3.

Additionally, the track unit 50, as best illustrated in FIG. 6, comprises two H-beams 60 having a web portion 60a, oppositely directed leg portions 60b and 60c and oppositely directed leg portions 60d and 60e. Each leg portion 60d and 60e of the two H-beams 60 are formed with a groove 62 extending the full length thereof.

Each groove 62 has a rail 64 associated therewith and each rail 64 has a strip portion 64a that is press fitted into the groove 62 belonging to the particular leg portion 60d, 60e with which the rail 64 is associated. Additionally, each rail 64 is formed with a shoulder 64b and angled V-shaped surfaces 64c, as can best be understood from FIG. 6. It will be discerned from FIG. 6, however, that the grooves 62 are deeper than the strip portions 64a, there being a space 65 between the bottom of the groove 62 and the inner edge of the strip portion 64a. Thus, it is the shoulders 64b that abut against the leg portions 60d and 60e of the two H-beams 60 that accurately space the angled surfaces 64c of each pair of rails 64 with respect to each other.

Close inspection of FIG. 6 will reveal that the leg portions 60d and 60e of the H-beam 60 at the right have transverse slots 66 formed therein, whereas the leg portions 60d and 60e of the H-beam 60 at the left have only holes 68. By breaking away a section of the leg portion 60b at the right in FIG. 6, the slot 66 therein is exposed to view. Two bolts 70 extend through the slots 66 and two additional bolts 72 extend through the holes 68. Additional slots 66 and bolts 70 are employed at the top of the H-beam 60 at the right, and additional holes 68 and bolts 72 are made us of at the top of the H-beam 60 at the left. The upper and lower slots 66 and bolts 70 at the right enable the particular H-beam 60 to be adjusted whereas the H-beam 60 at the left is held fixedly in place by its upper and lower bolts 72 contained in the holes 68.

It is important to understand that the track unit 50 is assembled separately and then attached to the A-frame 12. More specifically, the track unit 50, although substantially vertical when assembled on the apparatus 10, is put together while horizontal. In this way, the two H-beams 60 can be precisely spaced with respect to each other so that the rails 64 are truly parallel. After being assembled, then the unit 50 is attached to the A-frame 12. More specifically, the top plate 52 overlies the top bar 14 and is secured thereto by bolts 76 visible in both FIGS. 1 and 2. Similarly, the sole plate 56 underlies the lower bar 16b of lowermost channel unit 16 and is secured thereto by bolts 77 visible only in FIG. 1. In this way the track unit 50 is fixedly retained as a unit in a truly perpendicular relationship with the axes of the rollers 46 on which the panel board 48 rests.

At this time, reference will be made to a vertically reciprocable carriage indicated generally by the reference numeral 80. The carriage 80 includes a base plate 82. A plurality of guide wheels 84, actually a total of eight such wheels, serve to constrain the carriage 80 for reciprocable movement along the track unit 50. The wheels 84 are journaled for rotation on shafts 86 that are attached to the base plate 82. Each guide wheel 84 is formed with a groove 88 therein having angled V-shaped sides 88a. The sides 88a engage or ride against the angled surfaces 64c belonging to the rails 64. Since the rails 64 are parallel to each other and the track unit 50 perpendicular to the axes of the rollers 42, it follows that the carriage 80 is constrained for reciprocal movement in a perpendicular relationship to the lower edge of the panel board 48 that is resting on the rollers 42. Thus, because the rollers 42 are arranged on a truly horizontal line and the track unit 50 in a truly vertical relationship that is perpendicular to the axes of the rollers 42, then the carriage 80 is constrained for movement in a direction determined by the rails 64. Once again, since the rails 64 are parallel with each other, the carriage 80 is tracked in a precise direction determined by the factory mounting of the H-beams 60 and the rails 6 mounted thereon.

Inasmuch as the carriage 80 is to be locked in place at any preferred elevation on the track unit 50, a brake mechanism 90 is employed. The brake mechanism 90 comprises a resilient U-shaped strip 92 having leg portions 92a and 92b plus a bight or connecting portion 92c (see FIG. 6). The leg portion 92a has a pair of tapped holes 94 formed therein which are in registry with holes 96 formed in the base plate 82 of the carriage 80. By means of bolts 98 extending through the holes 94 and 96, the U-shaped resilient strip 92 is anchored in place on the rear side of the base plate 82. It is of importance to note that the other leg 92b belonging to the U-shaped strip 92 has a brake shoe 100 secured thereto. The brake shoe 100 frictionally engages one side of the leg portion 60d belonging to the H-beam 6 at the left, as viewed in FIG. 6.

The brake mechanism 90 additionally includes a threaded shank 102 that has a grooved collar 104 that is received in an aperture formed in the leg portion 92b of the U-shaped strip 92. The threaded shank 102 passes through a bushing or sleeve 108. Inasmuch as the shank 102 is threaded, a knurled threaded knob 110 is instrumental in allowing the operator of the apparatus 10 to rotate the knob 110 so as to pull the brake shoe 100 against the leg portion 60d of the left H-beam 60 when the carriage 80 has been moved to the proper vertical height.

Continuing with the description of the carriage 80, it will be perceived that the base plate 82 thereof has a circular opening 112 formed therein, the opening 112 having angled V-shaped surfaces 112a.

Disposed for rotation in the opening 112 is a turntable 118 having a plurality of wheels 120, each provided with a groove 122 having angled V-shaped surfaces 122a that ride against the angled surfaces 112a belonging to the circular opening 112. The grooved wheels 120 are rotatably mounted on bolts or shafts 124 that project rearwardly from the back side of the turntable 118. The bolts or shafts 124 extend through tubular spacers or bushings 126.

Spaced just forwardly of the turntable 118 is a motor mounting plate 130, there being bolts 132 that hold the plate 130 in a fixed relationship slightly forwardly of the turntable 118. There is an electric motor 134 attached to the mounting plate 130 by reason of bolts 136. The motor 134 has a shaft 138 projecting to the right with a drive pulley 140 attached thereto.

Whereas the electric motor 134 is mounted on the front or forward side of the turntable 118 through the agency of the plate 130, a saw mount 150 is attached to the rear side of the turntable 118. More specifically, the saw mount 150 includes a tubular bearing 152 having forwardly extending tubular legs 154 thereon. The legs 154 are anchored to the rear side of the turntable 118 by means of bolts 156. The tubular bearing 152 journals a shaft 158 having a driven pulley 160 at the right end thereof. A circular saw blade 162 is keyed to the other end of the shaft 158. By reason of two collars 164 that are simply pressed against the sides of the blade 162 by a nut 166 threaded on that particular end of the shaft 158.

What has not been explained up to this point is that the turntable 118, while basically constituting a circular disk, has a chordal edge 170 (see FIGS. 1, 3 and 4) which forms a segmental opening 172. In FIG. 1, the chordal edge 170 is vertical, but it will be appreciated that when the turntable 118 is rotated in a clockwise direction through 90° the chordal edge 170 assumes a horizontal position, thereby angularly shifting the segmental opening from a generally three o'clock position to a generally six o'clock position. What should be appreciated at this stage, though, is that the drive pulley 140 and the driven pulley 160 are in alignment with each other so that a belt 176, when entrained about the pulleys 140 and 160, passes through the segmental opening 172 and is shifted in unison therewith. This is an important feature of the invention and it is believed that the benefits to be derived therefrom will be more fully appreciated as the description progresses.

Figure 3:
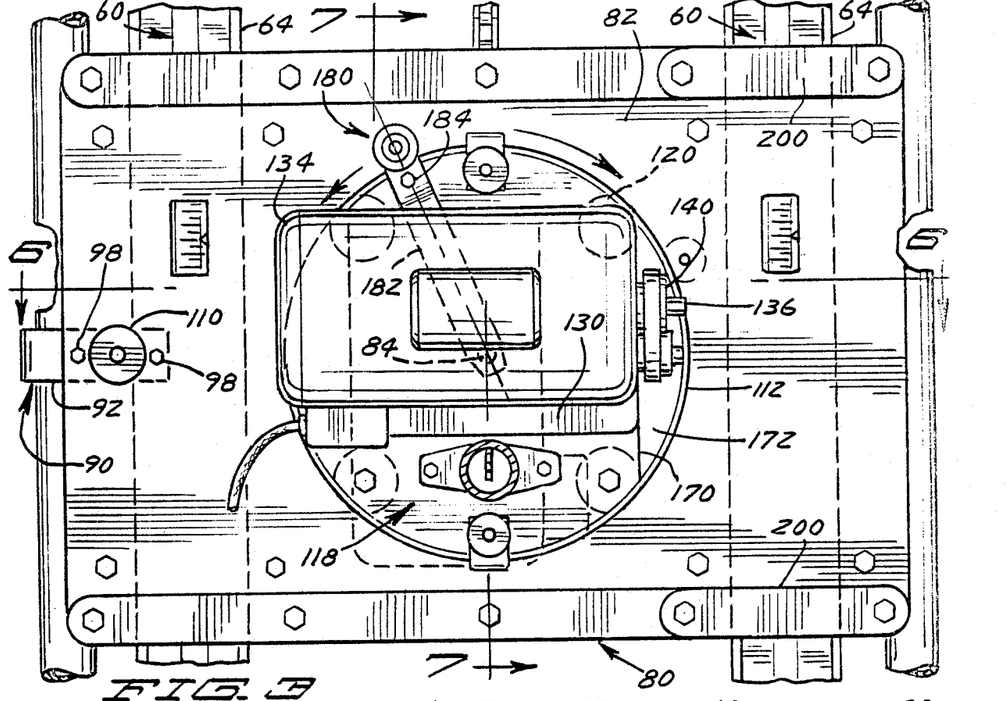
FIG. 3 is an enlarged fragmentary view, the view showing the front of the carriage and turntable.
Figure 4:
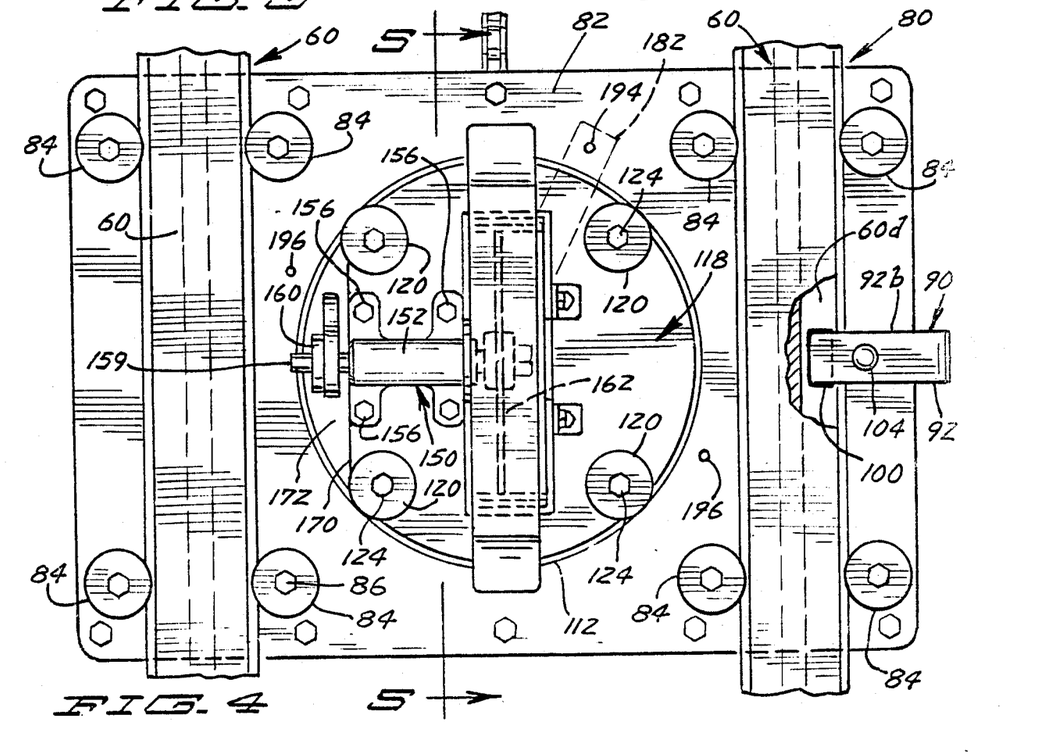
FIG. 4 is a view similar to FIG. 3 but taken from the rear.
Figure 7:
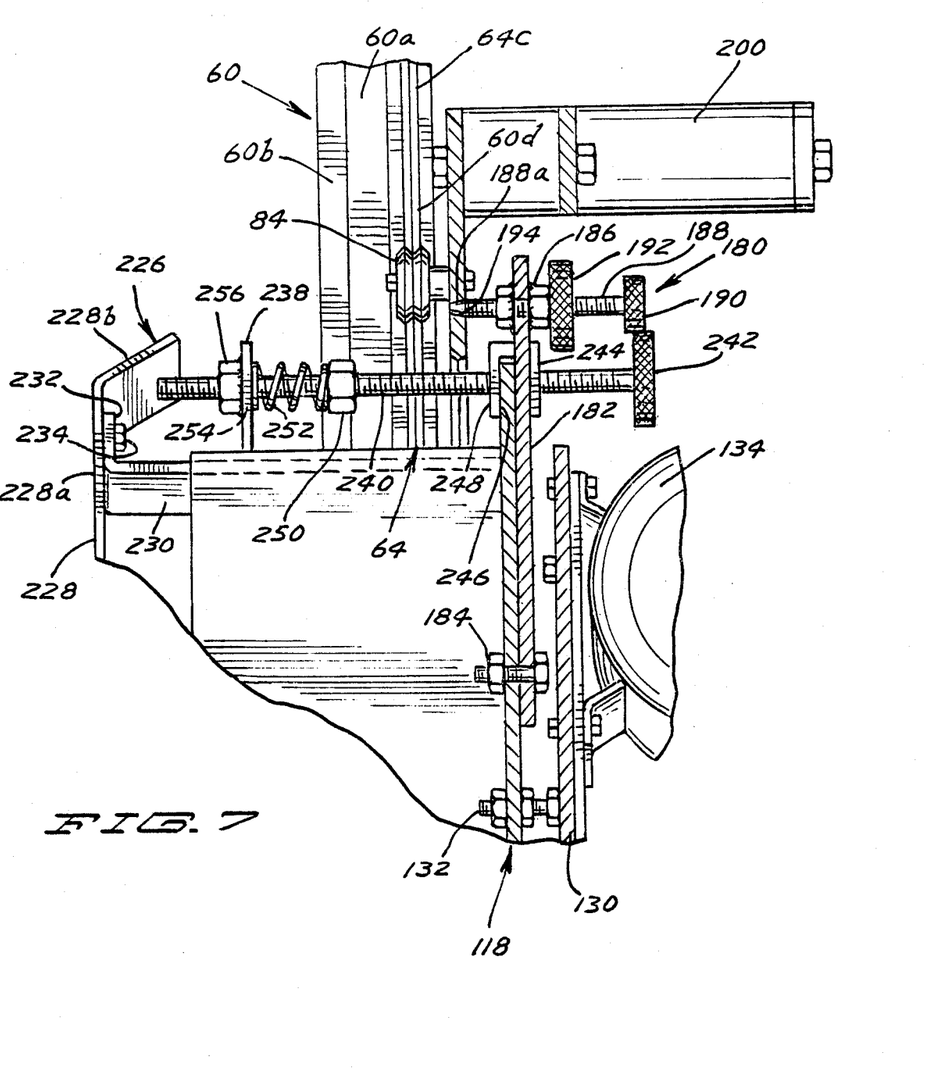
FIG. 7 is a fragmentary sectional view taken in the direction of line 7—7 of FIG. 3.

Having mentioned that the chordal edge 170 assumes either a vertical position, as shown in FIGS. 1, 3 and 4 or a horizontal position when the turntable 118 is rotated through 90° in a clockwise direction, it should be appreciated that a latch mechanism 180 is employed for retaining the turntable 118 in either of its two rotative positions. The latch mechanism 180, as best understood from FIG. 7, comprises a radially extending strip 182 that is fastened to the turntable 118 by means of a pair of bolts 184, both of which are shown in FIG. 3 and one of which can be more clearly seen in FIG. 7. A pair of nuts 186 ar welded in place to the opposite sides of the strip 182. A shank 188 is threadedly received in the nuts 186, the shank 188 having a tapered end 188a thereon. The shank 188 has a knob 190 at the right end thereof in FIG. 7 by reason of which the shank 188 can be rotated to advance its tapered end 188a either to the left or retract the tapered end 188a to the right as viewed in FIG. 7. A knurled lock nut 192 is also threadedly carried on the shank 188 and locks, when tightened, the latch mechanism 180. The tapered end 188a is engageable in either of two tapered holes 194 or 196. The hole 194 appearing in FIG. 7 is instrumental in maintaining the turntable 118 in a rotated position such that the chordal edge 170 is vertical. In other words, FIG. 7 depicts the latch mechanism 180 holding or retaining the turntable 118 in a rotated position such that the blade 162 is vertical. The hole 196, however, is located so that when the turntable 118 is rotated through a 90° angle to shift the blade 162 into a horizontal position, then the tapered end 188a is advanced into engagement with that hole 196 instead of the hole 192.

Inasmuch as the carriage 80 is to be manually raised and lowered, a pair of handles 200 are secured to the plate 82. Also, in order to facilitate the raising and lowering of the carriage 80, a counterbalancing mechanism 202 is employed which includes a chain 204 that passes over a pair of cog wheels 206 and 208 and a weight 210 that slides in a rectangular guide tube 212, the upper end of the guide tube being held in place by reason of a rearwardly directed member 272 fastened to the upper end of the guide tube 212 (see FIG. 2). As can be seen in FIGS. 1 and 2, bolts 274 hold a casing 275 in place, the casing enclosing the upper stretch of the chair 204 and the cog wheels 206 and 208 over which the chain passes. Upper and lower stop members keep the carriage from being raised too far and also from being lowered to too great an extent.

Although not a part of the invention itself, nonetheless it is important to recognize that my apparatus lends itself readily to having a dust collection system 220 incorporated therein. The system may be that described in U.S. Pat. No. 4,253,362, granted on Mar. 3, 1981 to Larry E. Olson for "APPARATUS FOR COLLECTING SAWDUST PRODUCED BY A CIRCULAR POWER SAW." In the illustrated situation, only a portion of the system 220 is depicted. It will be seen that there is an elbow 222 to which a flexible hose 224 is attached; portions of the hose 224 have been broken away in order to expose to view components that would otherwise be concealed. The flexible hose extends 224 to a tank-type vacuum cleaner or vacuum source, neither of which is illustrated.

Reference will now be made to a floating saw foot adjustment feature, more specifically involving a pressure foot mechanism that has been indicated generally by the reference numeral 226. The mechanism 226 comprises a foot pad 228 having a flat surface portion 228a that can be pressed against the panel board 48; the foot pad 228 also has angled end portions 228b. The mechanism 226 is supported on the turntable 118 and includes slidable strips 230 having right angled ends 232 that are secured to the flat surface portion 228a by means of bolts 234. There are slotted guide members 236 that are fixedly attached at one end to the rear side of the turntable 118, the slidable strips 230 having integral ears or lugs 238.

Additionally the pressure foot mechanism 226 includes upper and lower threaded adjustment rods 240, each having a knurled knob 242 attached thereto. Also, the mechanism 226 includes what will be called reaction blocks 244, each having a slot 246 formed therein and by way of tapped holes 248 in the overlying portions of the block 244 each rod 240 can be advanced or retracted. There is a nut 250 that is welded to each rod 240; in practice, the rod 240 is milled from hexagonal stock so that the equivalent of the nut 250 remains. A coil spring 252 is held captive by the nut 250 (or its equivalent) so that the coil spring 252 in each instance bears against the ear or lug 238. Each ear or lug 238 has an untapped hole 254 through which its threaded rod 240 freely extends. At the other side of the ear or lug 238 is a retention nut 256 that is secured to its rod 240.

It should be readily apparent that when the two knobs 242 are rotated in one angular direction, the foot pad 228 is retracted relative to the panel board 48 being cut, whereas a reverse rotative direction will urge the foot pad 228, more specifically its flat surface portion 228a, against the panel board 48. The coil springs 252, there being one spring 252 for each rod 240, imparts a sufficient amount of pressure to the foot pad 228 so that it can yield when the forward edge of the panel board 48 acts against one of the angled end portions 228b.

Whereas the pressure foot mechanism 226 forces the panel board 48 against the A-frame 12, when thin panels are to be cut, it is desirable to supplement the action of the pressure foot mechanism 226. With this in mind, a hold down bar or tube 260 is provided which can be urged against the thin panel.

Having presented the foregoing description, the manner in which my apparatus 10 is used should be readily apparent. Nonetheless, in order to assure a complete understanding of the benefits to be derived from a practicing of the invention, a recapitulation of what has been referred to will now be given.

It should be borne in mind that the apparatus 10 requires no adjustment after it leaves the factory. In this regard, the track unit 50 is composed of the two H-beams 60 that are adjusted with respect to each other at the factory so as to assure parallelism between the rails 64. Of course, the rails 64 of each pair of rails 64 are parallel to each other by reason of the shoulders 64b thereof engaging the edges of the leg portions 60d at the H-beam 60 with which that pair of rails 64 is related. The track unit 50 is attached to the A-frame 12 by means of the welding 76 at the top and the welding 77 at the bottom so that it is maintained truly perpendicular to a line tangent to the rollers 46. Consequently, when a panel board 48 is placed on the rollers 42, then either an accurate horizontal cut or a vertical cut is assured.

Assuming for the moment that a vertical cut is desired, then the carriage 80 is manually raised to its fullest extent, the upper stops limiting the upper travel of the carriage 80. All that the operator need do is to grasp one or both of the handles 200 to move the carriage 80. Of course, the brake mechanism 90 must be released in order that the carriage 80 can be raised. The brake mechanism 90 is then readjusted so as to cause the brake shoe 100 to engage the leg portion 60d belonging to the left H-beam 60.

It is at this time that the operator adjusts the pressure foot mechanism 226 so as to position the foot pad 228 in a proximal relation with the A-frame 12. He does this in general accordance with the thickness of the panel board 48 to be cut. Inasmuch as the pressure foot mechanism 226 possesses a "floating" characteristic, he adjustment need not be precise, for when the carriage 80 is lowered to effect a cut, the lower angled end portion 228b that is integral with the flat surface portion 228a simply rides onto the panel board 48, causing the upper coil spring 252 to compress, ad as the carriage 80 is lowered farther the lower coil spring 252 compressed to whatever degree is needed to accommodate the thickness of the particular panel board 48.

It will be understood that the panel board 48, owing to the fact that its lower edge rests on the rollers 42, can be readily shifted into position so that the circular saw blade 162, which is vertical in the position depicted in FIG. 1, will initiate a saw cut at the proper location. Continued lowering of the carriage 80 will cause the cut to be progressively lengthened and if the entire height of the panel board 48 is to be cut, the carriage 80 simply is moved downwardly until the lower stops are engaged.

When a horizontal cut is to be made, then the turntable 118 must be rotated through 90° in order to orient the circular saw blade 162 in a horizontal plane, that is, in a plane parallel to the upper surfaces of the rollers 42 (that is, parallel to the axes or which the rollers 42 are journaled) that support the lower edge of the panel board 48 The brake mechanism 90 is released by simply rotating the knob 110 so that the brake shoe 100 no longer frictionally engages the leg portion 60d of the left H-beam 60. When the carriage 80 is moved to the proper height for the horizontal cut to be made, then the brake mechanism 90 is retightened so that the brake shoe 100 bears tightly against the leg portion of the left H-beam 60. The operator then manually pushes or shifts the panel board 48 to the left and the saw blade 162 effects the cut at the proper location.

It should be appreciated that my apparatus 10 enables a full view of the circular saw blade 162. In this regard, the track unit 50, which is comprised of the H-beams 60, is offset in a forward direction a considerable distance from the plane of the A-frame 12. The turntable 118 is offset forwardly even to a greater extent.

Figure 5:
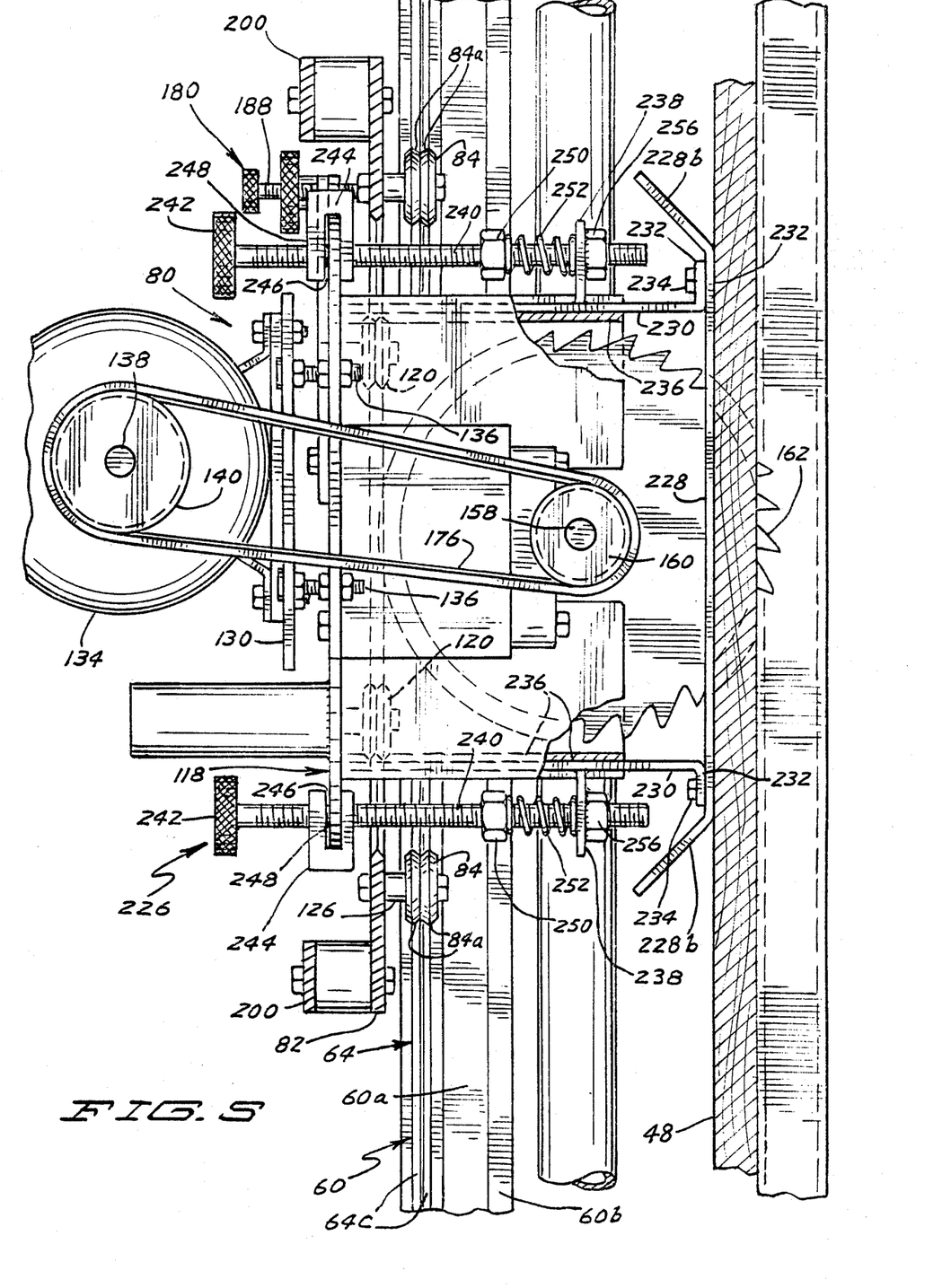
FIG. 5 is a sectional view taken in the direction of line 5—5 of FIG. 4, the view being on even a larger scale than that of FIG. 4.

Hence, as can be understood best from FIG. 5, the saw mount 150, which is on the rear side of the turntable 118, permits the complete circular saw blade 162 to be located to the rear of the turntable 118 rather than extending partially through the turntable as in the past. Previously, the drive motor 134 has been mounted on the forward side of the turntable 118 and there has been a direct drive of the circular saw blade 162 by reason of the saw blade 162 being mounted directly on the motor shaft 138 with only a toothed segment of the blade 162 extending through the prior art type of turntable, such as that illustrated in said U.S. Pat. 4,253,362.

The electric motor 134 in the present instance, as in the past, is mounted on the forward side of the turntable 118 by reason of the plate 130 but the saw mount 150, together with the circular saw blade 162, is completely disposed behind the turntable 118.

Coupled with the precise location of the rails 64 by virtue of the manner in which they are mounted on the H-beams 60, a very accurate saw cut can be made. In practice, the accuracy is well within ±0.005 inch. This is believed to be a degree of precision far better than what has been achieved in the past.

I claim:

1. Panel saw apparatus comprising a generally upright frame, vertical track means including a pair of laterally spaced H-beams, each having a first pair of oppositely directed leg portions secured to said frame and a pair of second oppositely directed leg portions spaced forwardly of said frame, said vertical track means also including a rail member mounted on each of said second leg portions, a carriage including upper and lower pairs of wheels engaging the rail members on each of said beams so that said carriage is constrained for reciprocable movement in a generally vertical plane forwardly of said beams, said carriage including a plate having a circular opening therein, a turntable mounted for rotation relative to said circular opening and forming a segmental opening relative to an arcuate edge of said circular opening, an electric motor supported on one side of said turntable and said motor having a shaft projecting therefrom, a drive pulley on said motor shaft in alignment with said segmental opening, a saw mount supported on the other side of said turntable and said saw mounted having a shaft projecting therefrom, a driven pulley on one end of said saw mount shaft in alignment with said segmental opening and also in alignment with said drive pulley, the other end of said saw mount shaft being adapted for the attachment of a circular saw blade thereto, and a flexible belt entrained about said pulleys and extending through said segmental opening.

2. Panel saw apparatus in accordance with claim 1 including a brake mechanism mounted on said carriage, said brake mechanism including a brake shoe engageable with one of the leg portions on one of said H-beams in order to maintain the carriage at a desired height.

3. Panel saw apparatus in accordance with claim 2 in which said brake mechanism includes a U-shaped resilient strip having first and second leg portions, means securing one of said first leg portions to said carriage and means for causing said second leg portion to be flexed in a direction to cause said brake shoe to bear against one of said leg portions, of one of said H-beams.

4. Panel saw apparatus in accordance with claim 1 in which said second leg portions of each of said H-beams has a longitudinal groove formed therein, and each of said rail members having a strip portion received in said grooves, said rail members also each having a shoulder bearing against the second leg portion with which it is associated to thereby determine the lateral spacing of each pair of rail members.

5. Panel saw apparatus in accordance with claim 4 in which one of said H-beams is adjustable relative to the other of said H-beams so as to determine the spacing of one pair of rail members relative to the other pair of rail members.

6. Panel saw apparatus in accordance with claim 5 in which said rail members have angled surfaces, and said wheels on said carriage have complementally angled surfaces engaging the angled surfaces on said rail members.

7. Panel saw apparatus in accordance with claim 1 in which said circular opening has angled surfaces, and wheels rotatably mounted on said turntable and formed with grooves having angles surfaces complementing the angled surfaces on said plate.

8. Panel saw apparatus in accordance with claim 7 in which said carriage plate has two tapered apertures therein spaced 90° with respect to each other, and said turntable has a latching mechanism mounted thereon, said latching mechanism including a threaded shank having a tapered end that is selectively engageable with either of said tapered apertures, whereby said turntable can be retained in either of two angularly rotated positions.

9. Panel saw apparatus in accordance with claim 8 including a pressure foot mechanism mounted on the rear side of said turntable including a foot pad for pressing against the surface of the panel board being cut.

10. Panel saw apparatus in accordance with claim 9 in which said foot pad has a flat surface portion and angled end portions, slidable strips connected at one end to said flat surface portion, guide members slidably mounting said slidable strips, an ear integral with each of said slidable strips, a threaded adjustment rod associated with each ear, and a knob on said threaded adjustment rod for positioning said foot pad with respect to the panel board being cut.

11. Panel saw apparatus in accordance with claim 10 including a coil spring encircling each of said rods so that said foot pad resiliently bears against the panel board being cut.

12. Panel saw apparatus comprising a frame, track means including a pair of generally vertical beams, each having an H-shaped cross section formed with a web portion and first and second oppositely directed leg portions residing in generally parallel planes, means attaching said first leg portions to said frame, oppositely issuing rail members attached to each beam having V-shaped angled surfaces, each of said leg portions having a groove formed therein and each of said attaching means having a portion press-fitted into one of said grooved leg portions, carriage means, and two pairs of vertically and laterally spaced wheels on said carriage means, said wheels being formed with grooves having V-shaped angled surfaces for engaging said V-shaped angled surfaces on said rail members.

13. Panel saw apparatus in accordance with claim 12 in which said press-fitted portions have parallel sides received in said grooves, each rail also having a projecting portion providing a shoulder in engagement with the leg portion with which it is associated, and said projecting portions having said V-shaped angled surfaces thereon.

14. Panel saw apparatus in accordance with claim 12 including a brake mechanism on said carriage means for clampingly engaging one of said forwardly disposed leg portions to retain said carriage means at a selected vertical location.

15. Panel saw apparatus in accordance with claim 12 in which said carriage means includes a plate having a circular opening formed therein, a generally circular turntable having a segmental opening with a chord-like edge, means mounting said turntable for rotation in said opening, an electric motor attached to said one side of said turntable and having a shaft, a pulley on said shaft in alignment with the segmental opening formed by said chord-like edge, a saw mount attached to the other side of said turntable having a saw mount shaft, and a pulley on said saw mount shaft in alignment with the opening formed by said chord-like edge, and a flexible belt entrained about said pulleys, said belt passing through said segmental opening.

16. Panel saw apparatus in accordance with claim 15 including a pressure foot mechanism mounted on the rear side of said turntable, said pressure foot mechanism including a foot pad engageable with the panel board being cut.

17. Panel saw apparatus in accordance with claim 16 including means for retaining said turntable in either of two angularly selected positions so that a circular saw blade mounted on said mount shaft can make a vertical cut or a horizontal cut depending upon which of the two angular positions of said turntable is selected.

* * * * *